(12) United States Patent
Bunzey et al.

(10) Patent No.: US 12,196,346 B2
(45) Date of Patent: Jan. 14, 2025

(54) DRYER EXHAUST VENT ASSEMBLY

(71) Applicant: BBY Solutions, Inc., Richfield, MN (US)

(72) Inventors: Chris Bunzey, Farmington, MN (US); Farhad Nourbakhsh, Apple Valley, MN (US)

(73) Assignee: BBY Solutions, Inc., Richfield, MN (US)

( * ) Notice: Subject to any disclaimer, the term of this patent is extended or adjusted under 35 U.S.C. 154(b) by 973 days.

(21) Appl. No.: 17/190,200

(22) Filed: Mar. 2, 2021

(65) Prior Publication Data

US 2022/0282808 A1 Sep. 8, 2022

(51) Int. Cl.
*F16L 21/06* (2006.01)
*D06F 58/20* (2006.01)
*F26B 21/00* (2006.01)

(52) U.S. Cl.
CPC ............ *F16L 21/065* (2013.01); *D06F 58/20* (2013.01); *F26B 21/008* (2013.01)

(58) Field of Classification Search
CPC ....... F26B 21/008; D06F 58/20; F16L 21/065
USPC .................................................... 34/86, 125
See application file for complete search history.

(56) References Cited

U.S. PATENT DOCUMENTS

| | | | | |
|---|---|---|---|---|
| 3,596,936 A * | 8/1971 | Dieckmann | ............. | F16L 59/18 |
| | | | | 285/423 |
| 6,016,610 A * | 1/2000 | Sears | ................... | F26B 25/007 |
| | | | | 34/604 |
| 6,443,834 B1 * | 9/2002 | Berger | .................... | F24F 13/06 |
| | | | | 454/353 |
| 6,682,415 B1 * | 1/2004 | Vagedes | .................... | F24F 7/00 |
| | | | | 454/339 |
| 6,780,100 B1 * | 8/2004 | Gretz | ........................ | F24F 7/00 |
| | | | | 34/235 |
| 7,383,645 B2 * | 6/2008 | Kong | .................... | F16L 3/1016 |
| | | | | 34/601 |
| 9,227,095 B2 * | 1/2016 | Tamburro | ................ | A62C 2/00 |
| 9,359,711 B2 * | 6/2016 | Houser | .................... | D06F 58/20 |
| 11,519,618 B1 * | 12/2022 | White | ........................ | F24F 7/04 |
| 2022/0282808 A1 * | 9/2022 | Bunzey | ................ | F26B 21/008 |

FOREIGN PATENT DOCUMENTS

| | | | |
|---|---|---|---|
| CA | 2258057 A1 | * | 6/2000 |
| CA | 3206602 A1 | * | 9/2022 |
| CN | 242511 Y | | 3/2001 |
| CN | 2497140 Y | | 6/2002 |
| CN | 204163819 U | | 2/2015 |
| DE | 3727908 A1 | | 3/1988 |
| EP | 344434 A | * | 12/1989 |

(Continued)

*Primary Examiner* — Stephen M Gravini
(74) *Attorney, Agent, or Firm* — Forsgren Fisher McCalmont DeMarea Tysver LLP; James M. Urzedowski; Daniel A. Tysver

(57) ABSTRACT

An improved dryer exhaust vent assembly for a clothes dryer is disclosed. The assembly includes an exhaust pipe having a variety of features on its external surface that are constructed and arranged to provide a more secured and easier to obtain engagement with commercially available or customized vent tubing. The assembly may also utilize adjustable band clamps or lever actuated collar clamps to further secure engagement of the vent tubing to the exhaust pipe.

8 Claims, 13 Drawing Sheets

(56) References Cited

FOREIGN PATENT DOCUMENTS

| KR | 2008010707 A | * | 1/2008 |
| WO | WO-2017099393 A1 | * | 6/2017 |
| WO | WO-2022187248 A1 | * | 9/2022 |

* cited by examiner

DRYER EXHAUST VENT ASSEMBLY

FIELD OF THE INVENTION

Embodiments disclosed herein are directed to apparatuses, systems and methods of their use for providing an improved dryer exhaust pipe which provides a more effective shape and connection mechanisms for connecting the exhaust pipe to commercially available dryer vent tubing (including both rigid duct style and flexible hose varieties of vent tubing) for venting dryer exhaust to the outside.

BACKGROUND OF THE INVENTION

Various dryer vent mechanisms and assemblies exist for venting the excess of moisture and heat, that a clothes dryer is known to produce, from the dryer's exhaust pipe to the outside of a building that the dryer is operating within. Typically, a first end of a length of flexible or rigid dryer vent tubing is slide over the exhaust pipe of the clothes dryer, and the second end of the tubing is secured to an exhaust port or vent that is mounted to the side of the building and which provides fluid communication between the outside of the building and the vent tubing interior. When a clothes dryer 100 is connected to the exhaust port 110 in such a manner, the exhaust air (arrows 105) from the dryer 100 may be properly vented out of the building when the dryer is operational such as in the manner shown in PRIOR ART FIG. 1.

As may be seen in PRIOR ART FIGS. 2-5 a typical clothes dryer 100 will be provided with an exhaust pipe 102 that is characterized by having a gradually tapering diameter along its length, so that a similarly sized piece of vent tubing 106 may be made to slide over the narrower end 104 in the pipe 102 and then secured to the pipe 102 using an adjustable band clamp 108 (also known as a worm gear clamp). While this type of dryer pipe to vent tubing connection is the standard for modern dryer venting, it nevertheless has several drawbacks and shortcomings.

A deficiency in this standard is due to the use of a gradually tapered exhaust pipe 102 (as best shown in PRIOR ART FIG. 5). The tapered shape of the pipe is necessary in order to allow the vent tubing of a similar diameter to slide over the pipe, but this type of connection is inherently prone to the tubing sliding off of the pipe even when a band clamp 108 is tightly secured around the junction of the tubing 106 and pipe 102. Tightening the band clamp 108 in an effort to better secure the tubing 106 to the pipe 102 is often futile, as it will sometimes encourage the vent tubing 106 to slide off of the end 104 of pipe as it is tightened, or worse, damage the tubing 106 and pipe 102 via excess compression.

Also, it is often the case that the connection between the exhaust pipe 102 and vent tubing 106 occurs in very confined spaces (see for example PRIOR ART FIG. 1), and that the bulk and weight of a typical clothes dryer 100 makes it difficult for a user to access the area of the connection. Not only does this circumstance make it difficult for the user to properly seat the vent tubing 106 over the exhaust pipe 102, but properly positioning the band clamp 108 over the assembled pipe 102 and tubing 106, such as in the manner depicted in PRIOR ART FIG. 3-5, and then manually tightening the band clamp 108 to a proper degree (with a screw driver, plyers or wrench; not shown) can be incredibly tedious if not impossible.

Various alternative pipe to vent tubing connections have been proposed including those that use magnetic connections, various "quick connect" interfaces, and even supplemental ductwork to act as a bridge between pipe and vent tubing, but all of these alternative connection assemblies are more costly, more burdensome, or simply fail to improve upon the standard connection. As such there remains a need for a dryer pipe to vent tubing interface and connection assembly that provides a more secure and stable interface between the pipe and tubing, and which ideally, is easier for a user to implement than the current standard connection. Embodiments disclosed herein provide such an improved interface.

SUMMARY OF THE INVENTION

Embodiments of the dryer pipe assembly described herein are directed to providing a clothes dryer with an improved exhaust pipe which has structural and surface characteristics that allow it to be more easily engaged by commercially available vent duct work or flexible hose (hereinafter collectively referred to as vent tubing). In addition, the unique characteristics of the dryer exhaust pipe disclosed herein provide for a more secure engagement between the pipe and vent tubing.

In some embodiments, the dryer exhaust pipe is configured to utilize a rigid lever actuated collar clamp as an alternative to the adjustable band clamp conventionally used to secure the vent tubing to the dryer exhaust pipe.

These and other aspects of the disclosure are illustrated in the accompanying drawings and described in greater detail below.

BRIEF DESCRIPTION OF THE SEVERAL VIEWS OF THE DRAWINGS

PRIOR ART

PRIOR ART

PRIOR ART

PRIOR ART

PRIOR ART

DETAILED DESCRIPTION

Figure 1:
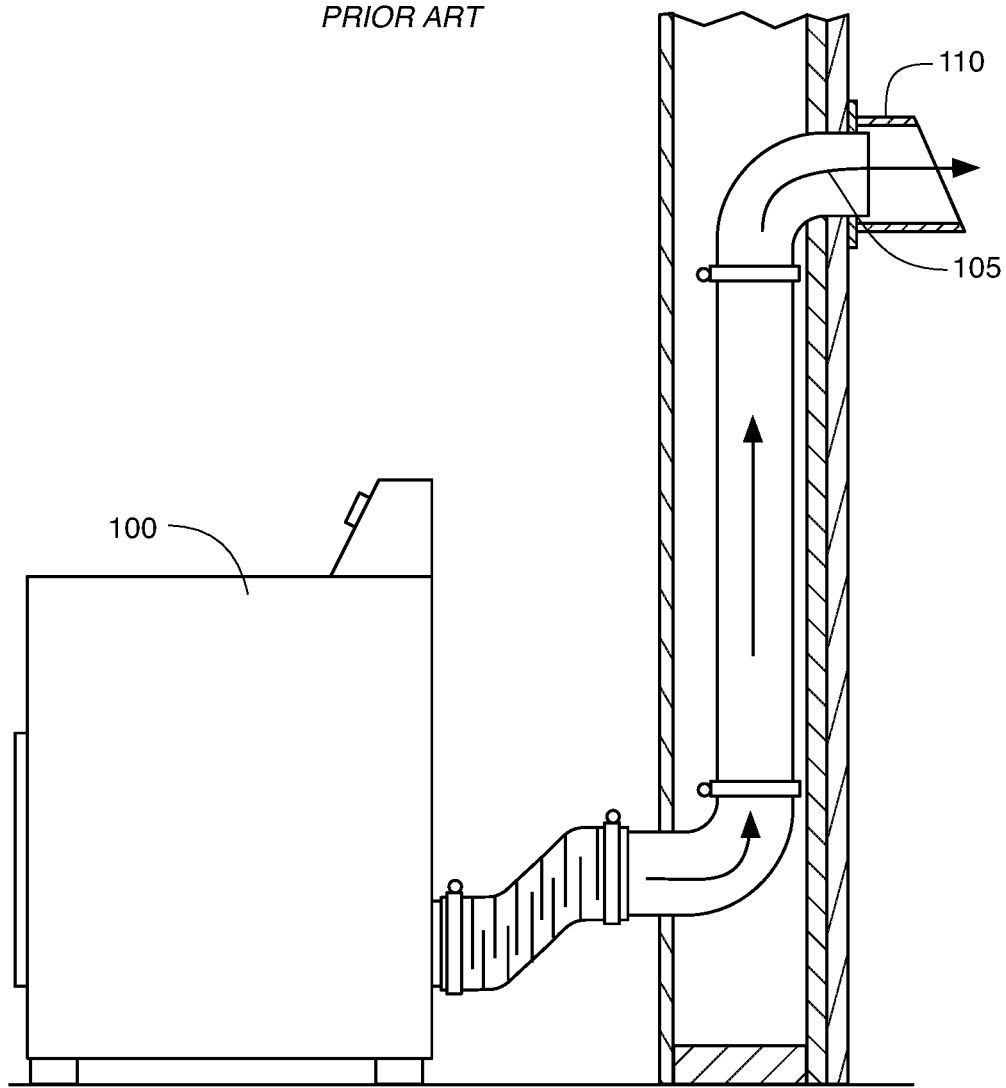
FIG. 1 is a side view of a conventional clothes dryer shown connected to commercially available connector vent tubing/exhaust duct work and illustrating the manner in which the vent tubing allows exhaust from the dryer to exit a building via an external exhaust port.
Figure 2:
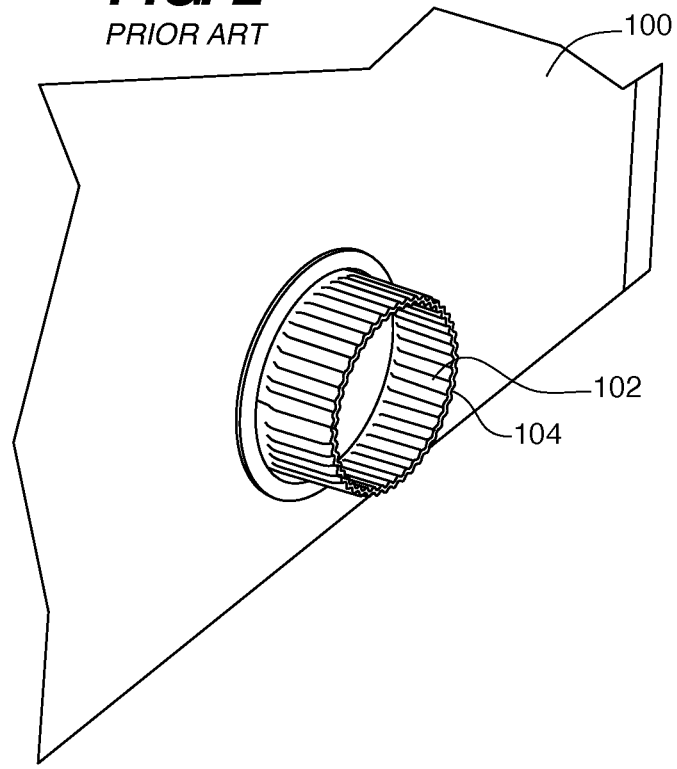
FIG. 2 is a partial perspective rear view of a clothes dryer featuring a conventional exhaust pipe.
Figure 3:
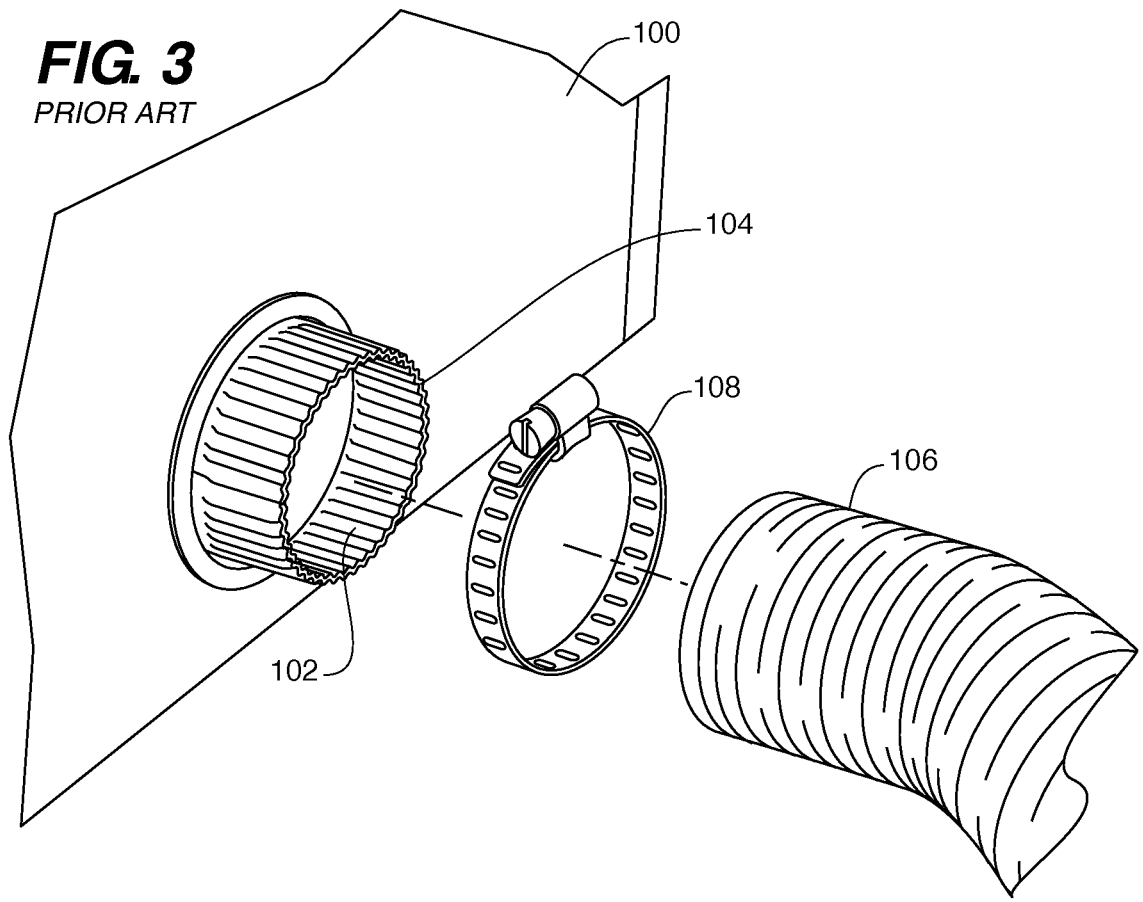
FIG. 3 is a perspective view of the clothes dryer of PRIOR ART FIG. 2 with commercially available vent tubing and an adjustable band clamp shown prior to the connection of the vent tubing to the exhaust pipe.
Figure 4:
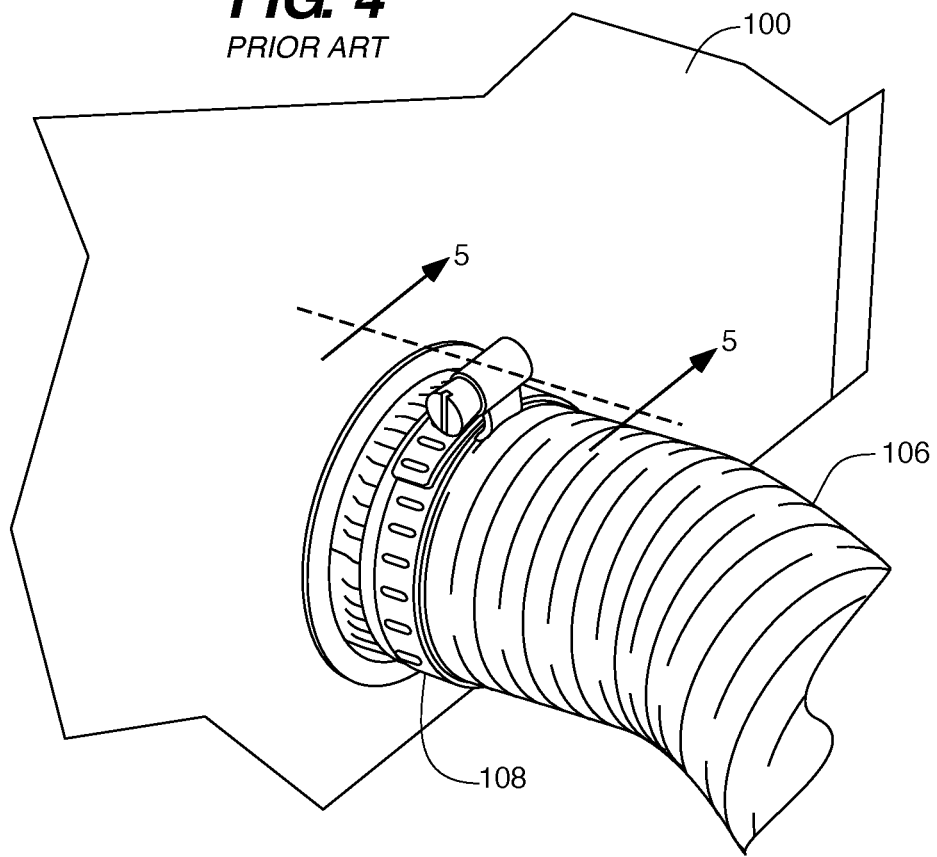
FIG. 4 is a perspective view of clothes dryer of PRIOR ART FIG. 3 showing the connected assembly of the commercially available vent tubing disposed about the conventional exhaust pipe and secured thereto using the adjustable band clamp.
Figure 5:
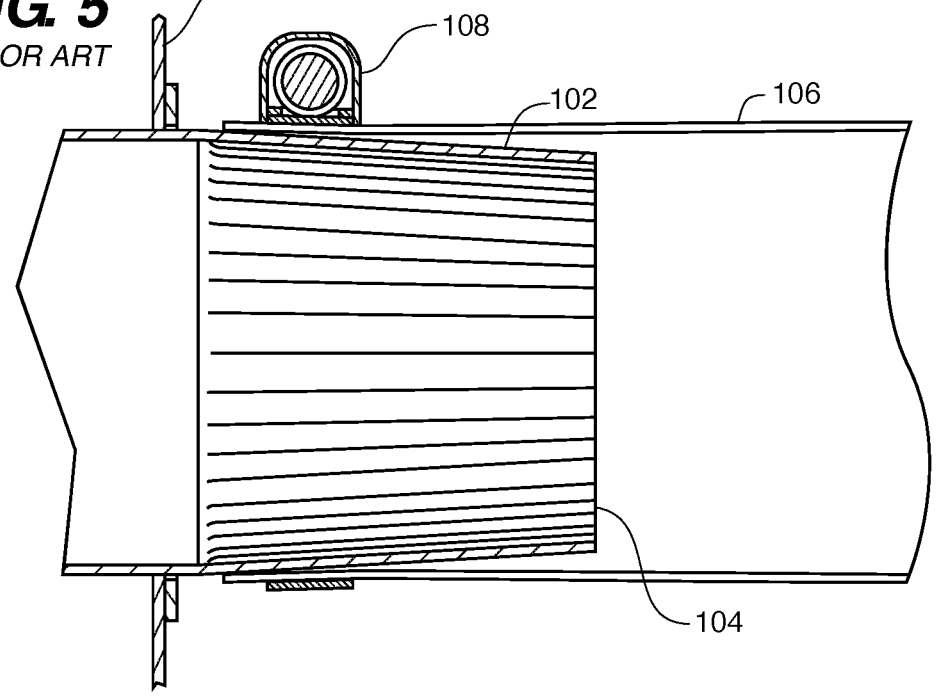
FIG. 5 is a side sectional view of the connected assembly shown in PRIOR ART FIG. 4.
Figure 6:
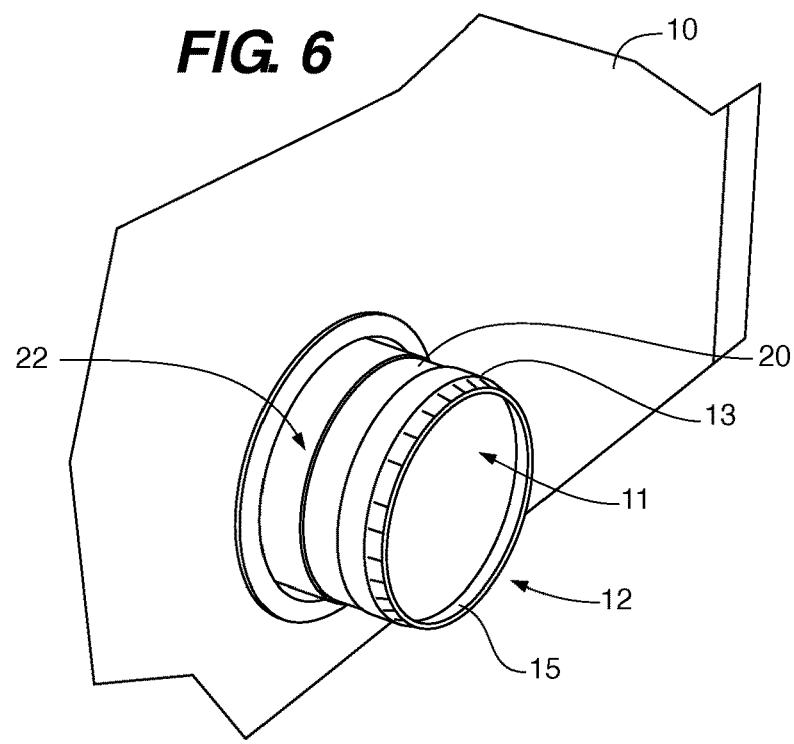
FIG. 6 is a partial rear perspective view of an improved clothes dryer featuring an improved exhaust pipe whose outer surface defines a band engagement groove and includes a guide flange.
Figure 7:
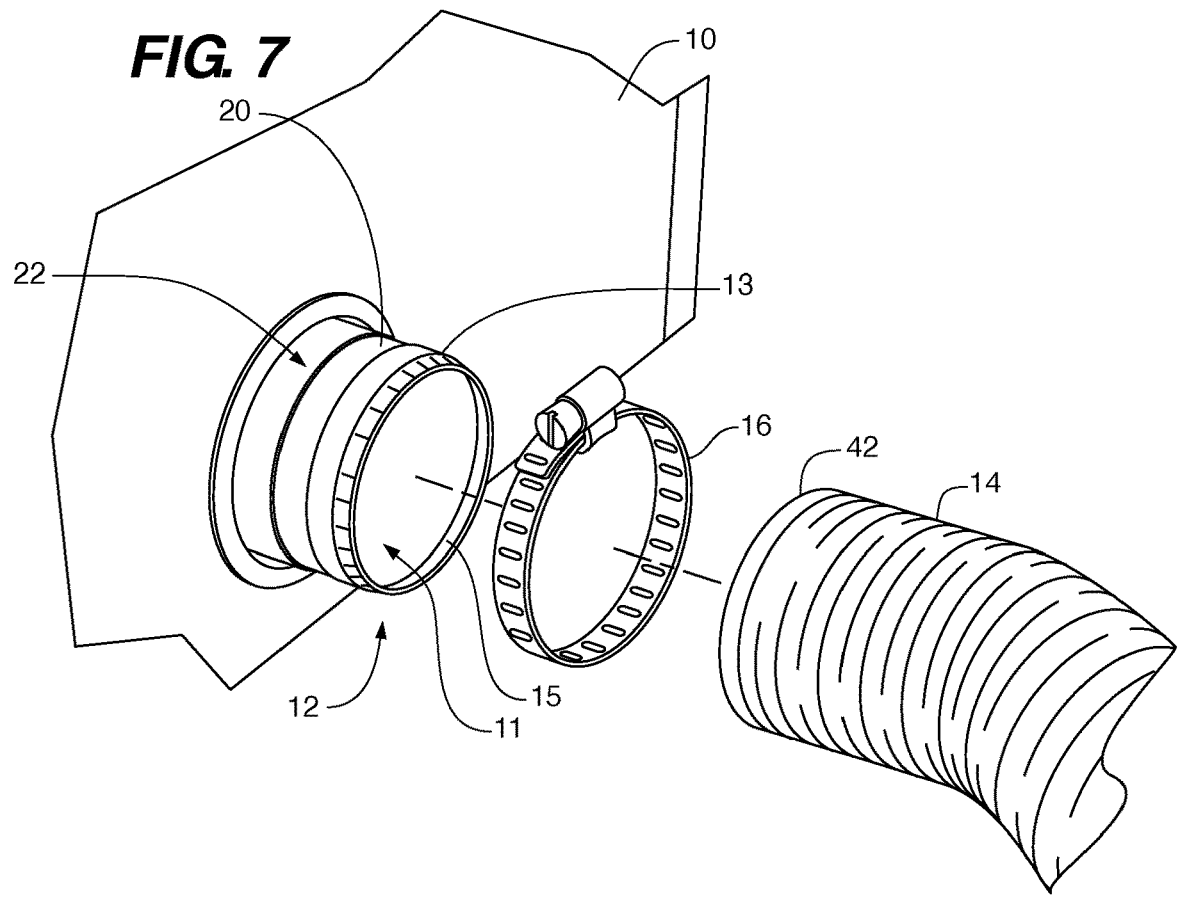
FIG. 7 is a perspective view of the improve clothes dryer of FIG. 6 with commercially available vent tubing and an adjustable band clamp shown prior to the connection of the vent tubing to the improved exhaust pipe.
Figure 8:
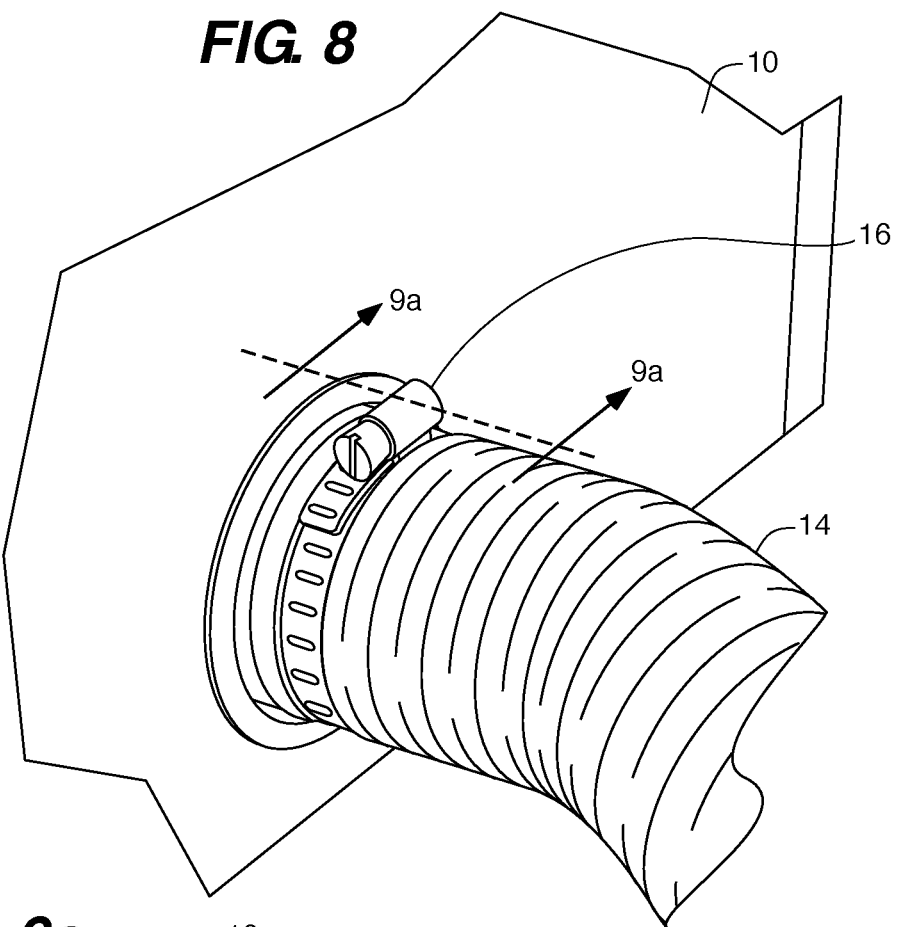
FIG. 8 is a perspective view of the improved clothes dryer of FIG. 7 showing the connected assembly of the commercially available vent tubing disposed about the improved exhaust pipe and secured thereto using the adjustable band clamp.

Embodiments of the dryer pipe assembly described herein, and shown in FIGS. 6-21, include a dryer 10 having an improved exhaust pipe 12.

The improved exhaust pipe 12 includes any of a variety of surface features that commercially available or customized vent tubing 14 can interface with, and which act to provide improved securement between the vent tubing 14 and exhaust pipe 12 with greater ease and reliability than existing interfaces provide for.

Rather than being a gradually inward tapering fructo-conical tube in the manner of PRIOR ART pipe 102 (see PRIOR ART FIGS. 2-5) that conventional dryers 100 (see PRIOR ART FIGS. 1-5) are provided with, the improved pipe 12 disclosed herein has, in general, a more cylindrical interior profile 11 with only the exposed end 13 of the pipe 12 provided with an inwardly tapered flange 15.

Figure 9A:
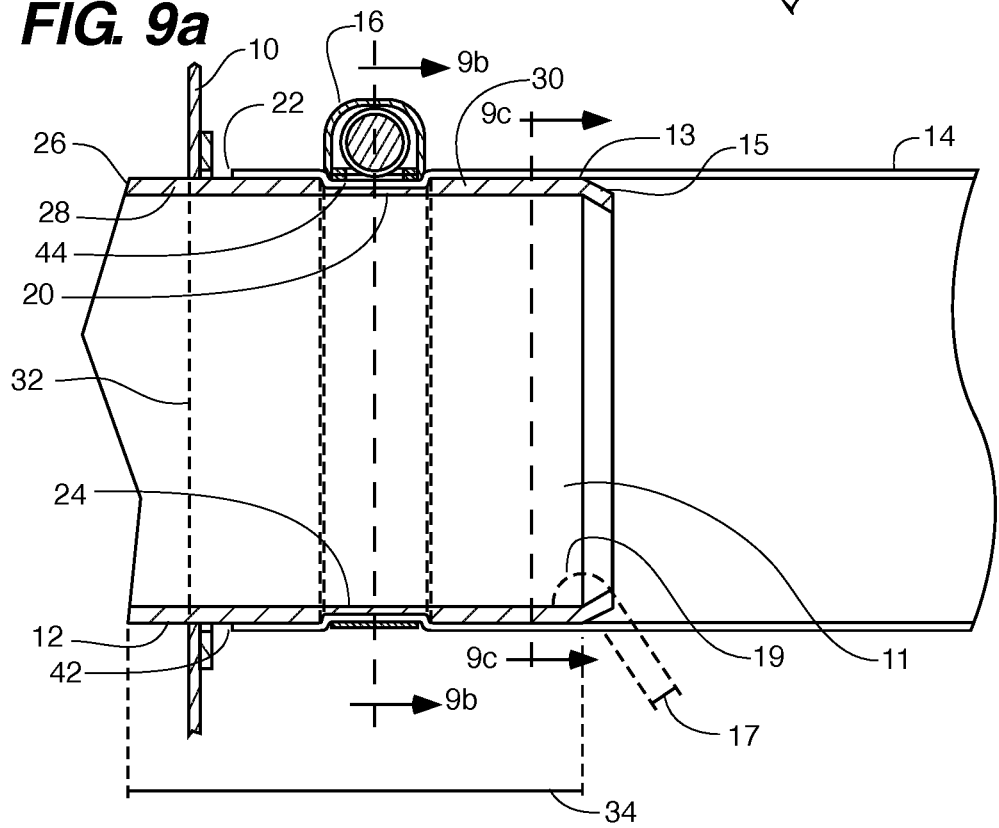
FIG. 9a is a side sectional view of the connected assembly shown in FIG. 8.
Figure 9B:
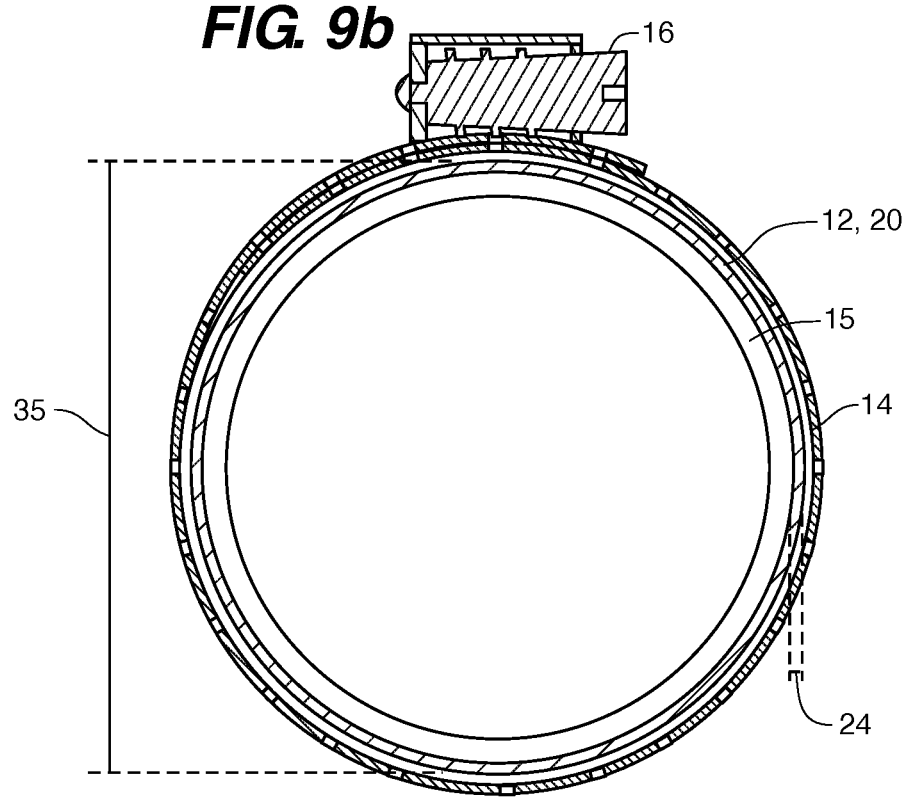
FIG. 9b is a cross-sectional view of the connected assembly shown in FIG. 9a taken along reference line A.
Figure 9C:
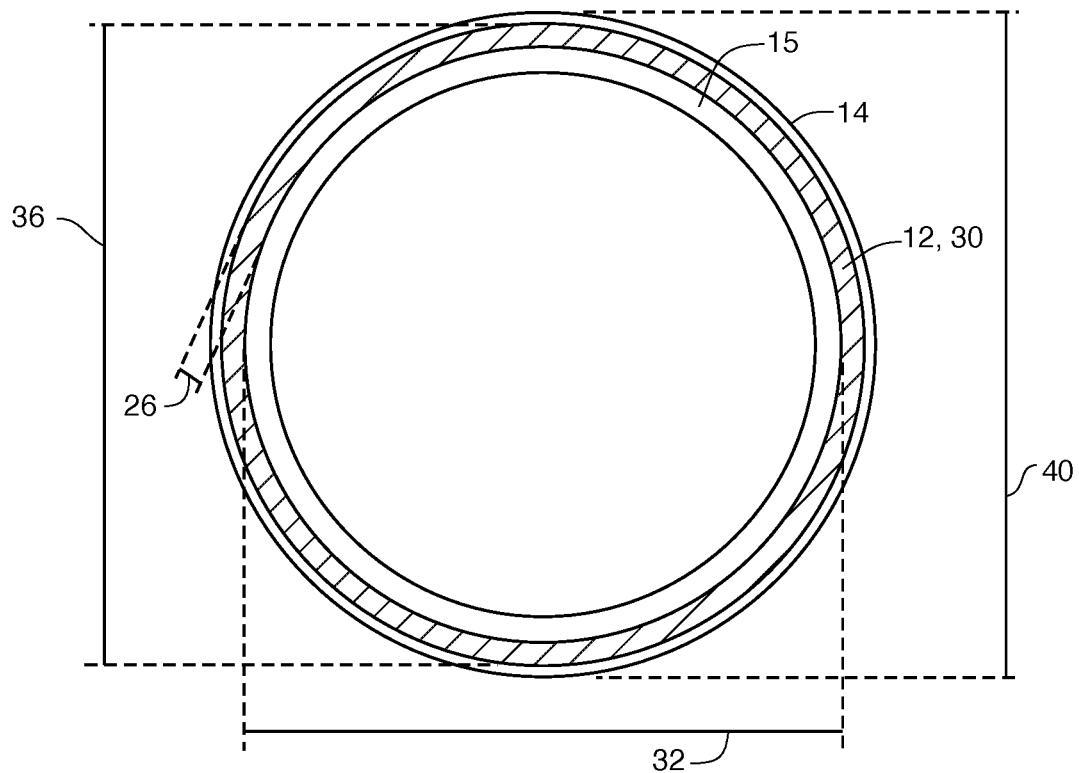
FIG. 9c is a cross-sectional view of the connected assembly shown in FIG. 9a taken along reference line B.
Figure 10:
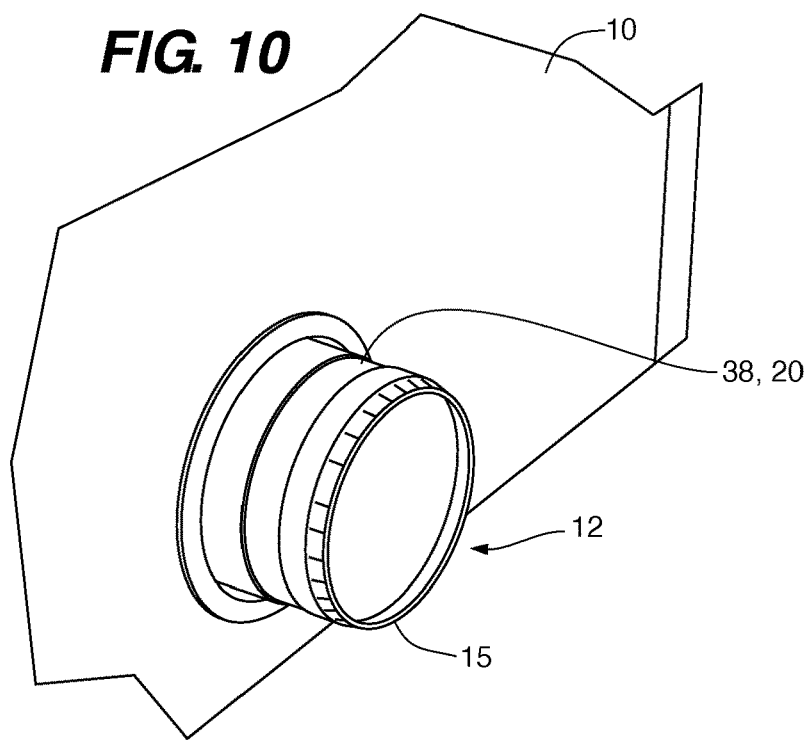
FIG. 10 is a partial rear perspective view of an improved clothes dryer featuring an alternative embodiment of the exhaust pipe shown in FIG. 6.
Figure 11:
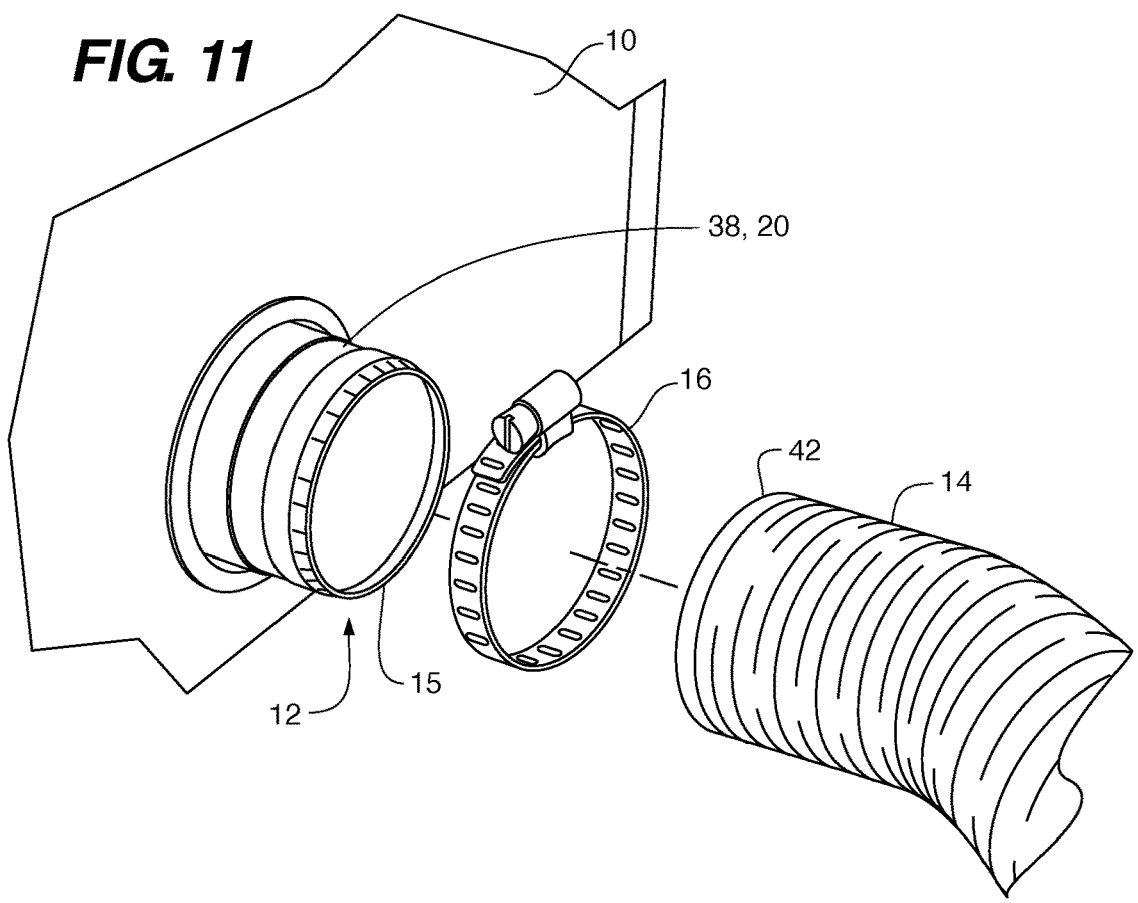
FIG. 11 is a perspective view of the improve clothes dryer of FIG. 10 with commercially available vent tubing and an adjustable band clamp shown prior to the connection of the vent tubing to the exhaust pipe.
Figure 12:
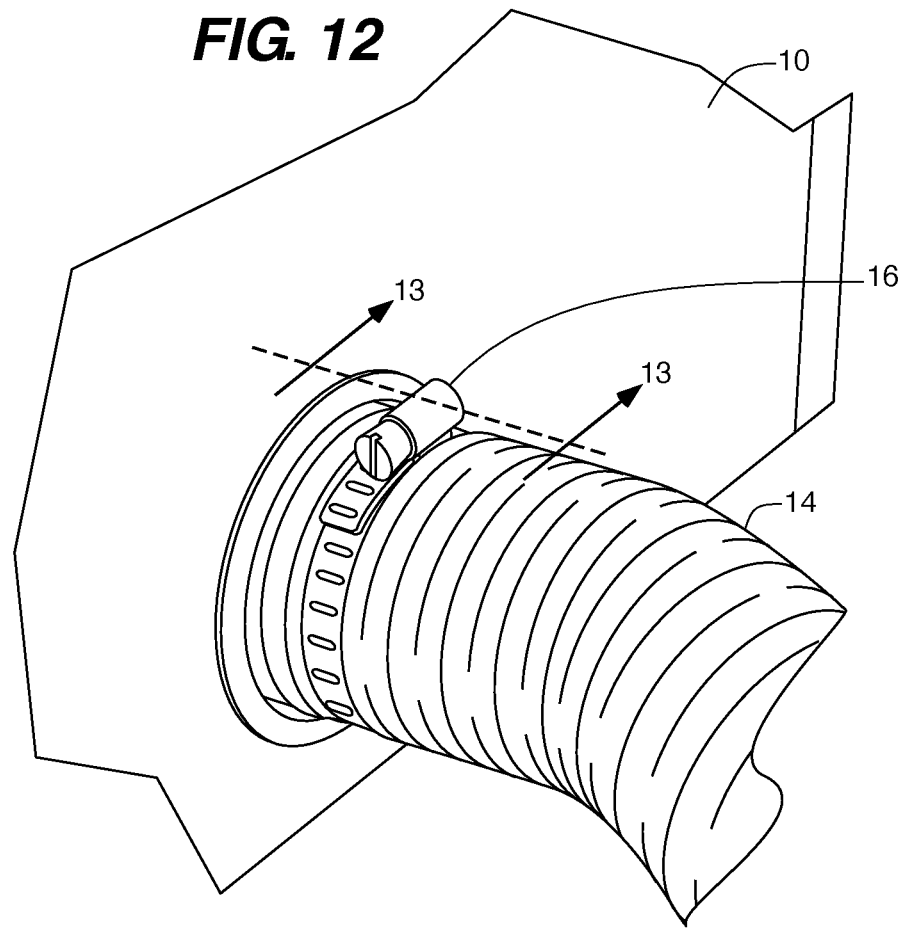
FIG. 12 is a perspective view of the improved clothes dryer of FIG. 11 showing the connected assembly of the commercially available vent tubing disposed about the exhaust pipe and secured thereto using the adjustable band clamp.

Flange 15 may have a variety of physical characteristics. In at least one embodiment, such as is best shown in FIG. 9a, the flange 15 has a length 17 ranging from about 0.125 inches (3.175 mm) to about 0.5 inches (12.7 mm) and defines and angle 19 of about 30 degrees relative to the otherwise cylindrical interior wall 21 of the pipe 12.

The flange 15 acts as a guide for engaging and sliding a piece of vent tubing 14 onto and over the pipe 12. The otherwise nominally cylindrical profile of the pipe 12 reduces the tendency of the vent tubing 14 from sliding off of the pipe 12 once it is properly seated thereabout, such as in the manner shown in FIGS. 8-9c, 12-13, 15-16c, 18-19 and 21.

In addition, some embodiments may include the use of a conventional adjustable band clamp 16 such as is shown in FIGS. 7-9a and 11-13 or a two position shaft collar clamp 18, such as is shown in FIGS. 14-21. Collar clamp 18 replaces the conventional band clamp 16 to provide an alternative securement mechanism that is easier for a user to manipulate and secure about the overlapping pipe 12 and vent tubing 14 assemblage.

Turning now to the specific embodiment shown in FIGS. 6-9a, the exhaust pipe 12 of the dryer 10 is characterized as a having a recessed groove or channel 20 defined by the outer surface 22 of the pipe 12. The channel 20 may be provided in any number of ways, such as for example, in the manner shown in FIG. 9a-9c, where the pipe 12 has a channel 20 that is a circumferential area of the pipe 12 that has a relatively thinner wall thickness 24 verses the greater wall thickness 26 of the pipe sections 28 and 30 adjacent thereto. In this manner the uniformly cylindrical inner diameter 32 of the pipe 12 is maintained along its entire length 34, while the outer diameter 35 of the pipe 12 in the region of the channel 20 is less than that of the outer diameter 36 of the adjacent pipe sections 28 and 30.

The outer diameter 36 will be approximately 4 inches. In some embodiments the outer diameter 36 will be less than 4 inches.

For the purpose of providing an adequate seal between the pipe 12 and the vent tubing 14, the maximum outer diameter 36 of the pipe 12 is slightly less than that of the inner diameter 40 of the vent tubing 14. As such, an end 42 of the vent tubing 14 may be slid over and disposed about the pipe 12 in the manner shown in FIGS. 7-9a. The adjustable band clamp 16 or two position shaft collar clamp 18 (see FIG. 13) will be pre-positioned about the vent tubing 14 so that when the vent tubing 14 is positioned over the pipe 12, the clamp 16/18 can be tightened such that it will push, compress or bias a region 44 of the vent tubing 14 that overlies the channel 20 into the channel 20 thereby securing and sealing the vent tubing 14 to the pipe 12 (see FIG. 9a). Such biasing of the region 44 of the vent tubing 14 that over lies the channel 20 may deform the vent tubing 14 as it is compressed into the confines of the channel 20 but the presence of the channel 20 helps to minimize or eliminate any impulse on the part of the user (not shown) to over tighten a conventional band clamp 16.

Figure 14:
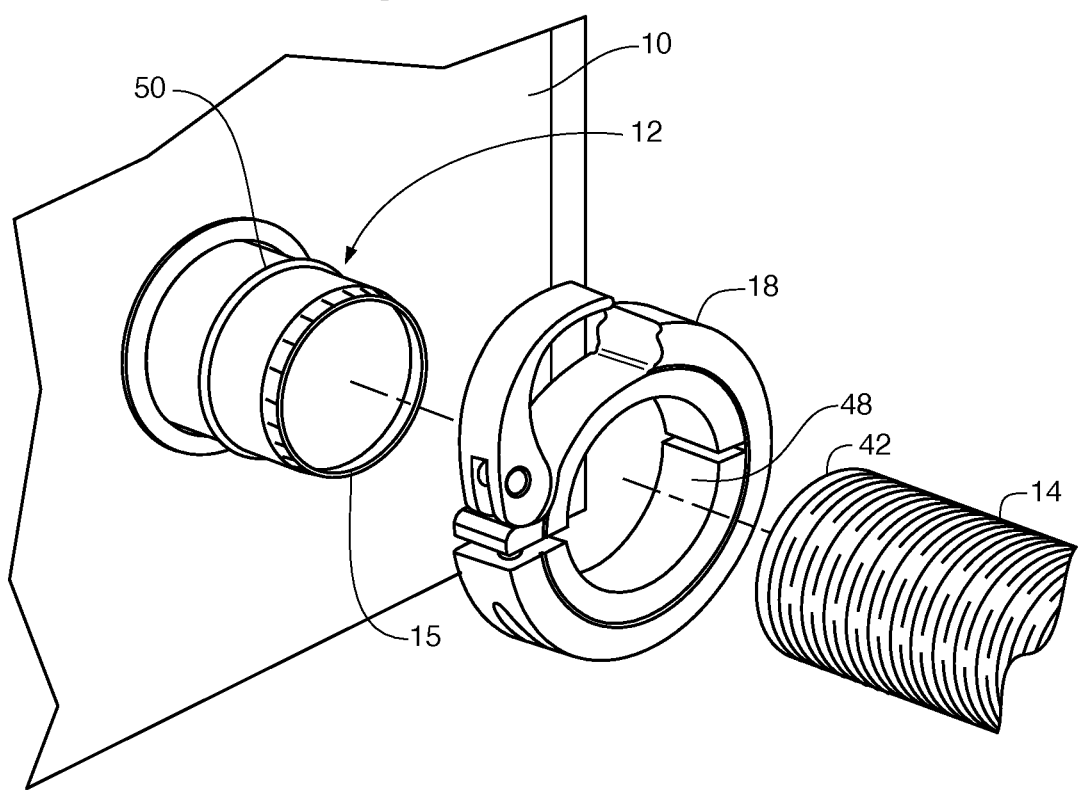
FIG. 14 is a partial rear perspective view of an improved clothes dryer having an embodiment of the improved exhaust pipe featuring an engagement lip, shown with commercially available vent tubing and including a lever actuated collar clamp shown prior to the connection of the vent tubing to the exhaust pipe.
Figure 15:
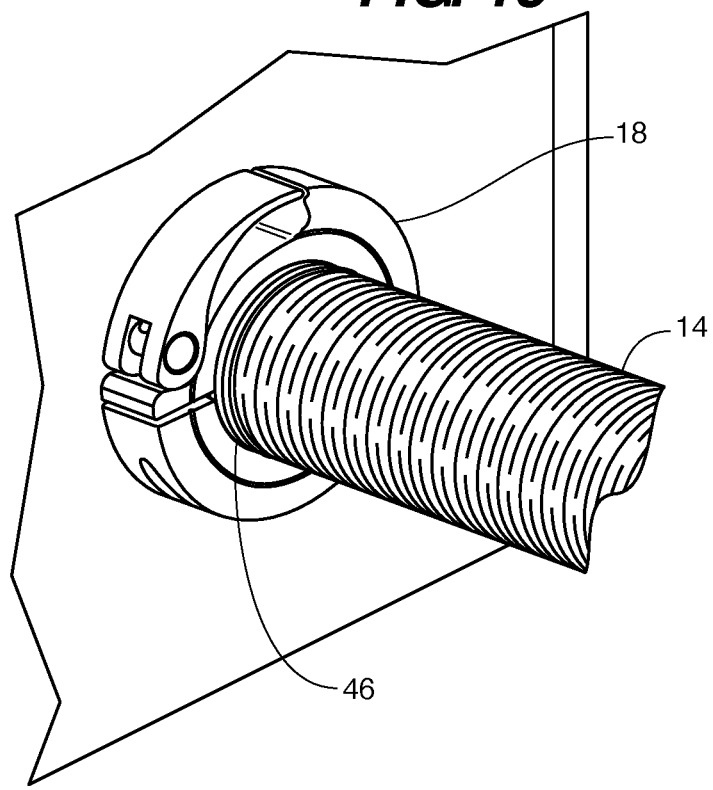
FIG. 15 is a perspective view of the improved clothes dryer of FIG. 14 showing the connected assembly of the commercially available vent tubing disposed about the exhaust pipe and secured thereto using the lever actuated collar clamp.

In at least one embodiment, wherein a two position shaft collar clamp 16 is used to secure the vent tubing 14 to the pipe 12 via engagement of the region 44 of the tubing 14 into the channel 20, the dimensions of the vent tubing 14 and the pipe 12 (specifically their wall thicknesses and diameters) are accounted for such that when the two position shaft collar clamp 18 is in the smaller diameter closed position 46 (see for example in FIG. 15 showing the two position shaft collar clamp 18 in the closed position 46 and FIG. 14 showing the two position shaft collar clamp 18 in the larger diameter open position 48) the two position shaft collar clamp 18 will compress or deform the region 44 of the vent tubing 14 into the channel 10, without deformation to the underlying pipe 12, effectively sandwiching the region 44 of the vent tubing 14 between the channel 20 and the clamp 18.

Figure 13:
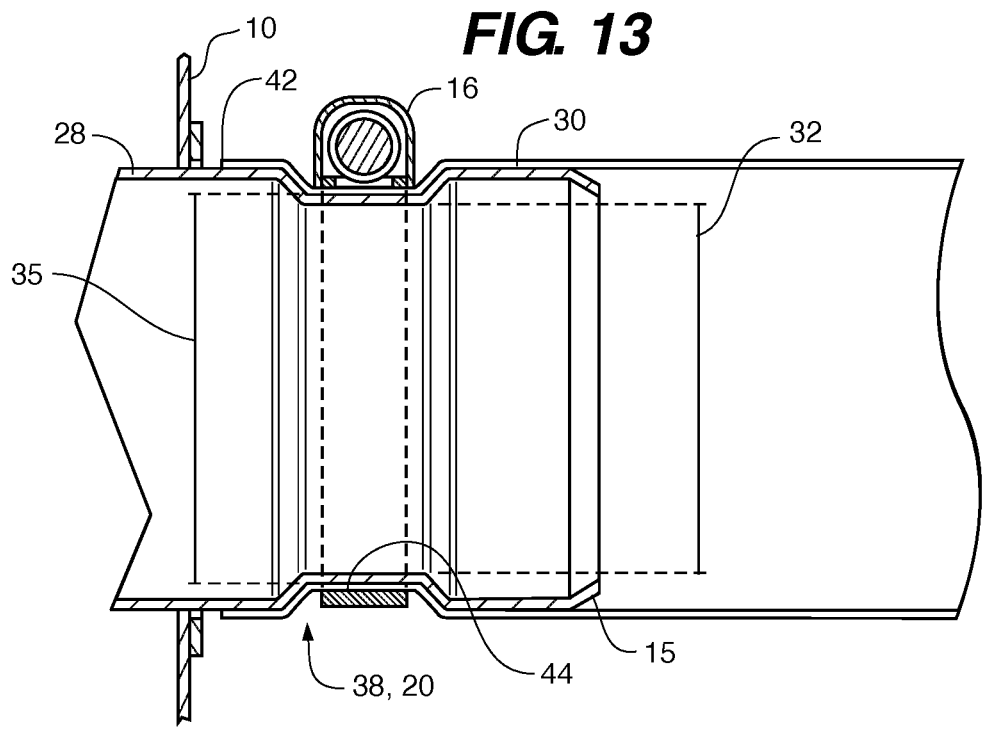
FIG. 13 is a side sectional view of the connected assembly shown in FIG. 12.

Alternatively, the pipe 12 may have a channel 20 that is formed by providing the pipe with a crimped area 38, such as in the manner shown in FIGS. 10-13, wherein the channel 20 is a region of the pipe 12 that has both a narrower inner diameter 32 and outer diameter 35 relative to sections 28 and 30 (see FIG. 13). In this embodiment, once the end 42 of the vent tubing 14 is slid over the pipe 12 in the manner shown in FIGS. 11-13, either type of clamp 16 or 18 may be secured about the engagement region 44 of the vent tubing 14 and channel 20 in the manner previously described.

Figure 16A:
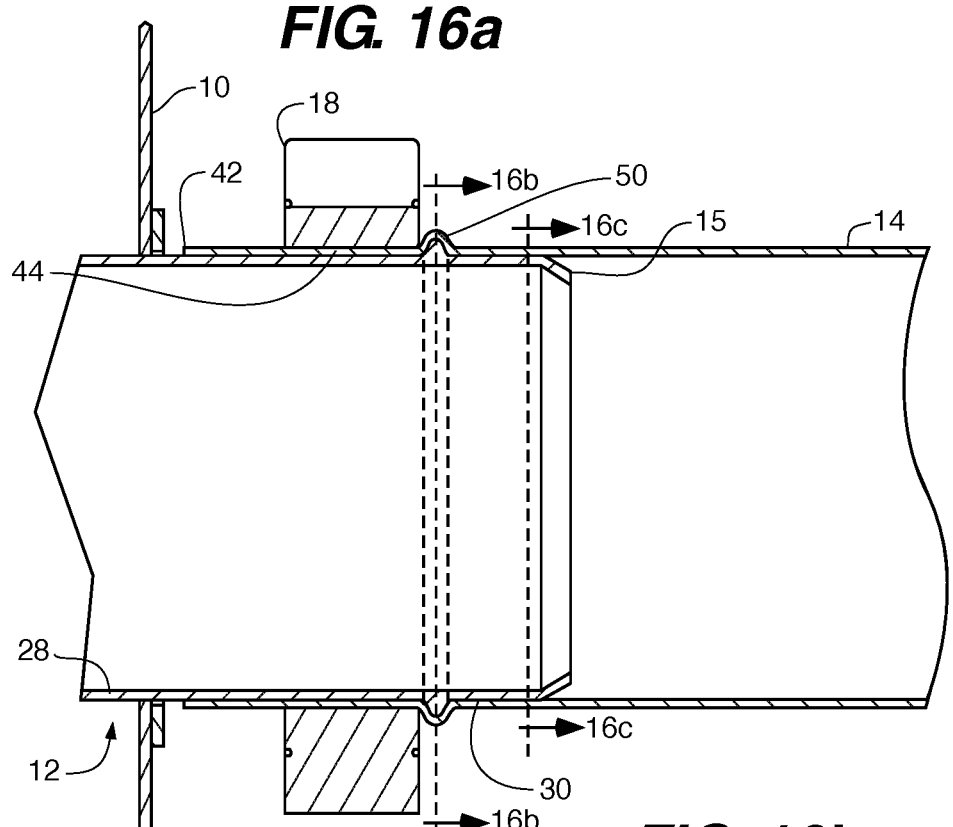
FIG. 16a is a side sectional view of the connected assembly shown in FIG. 15.
Figure 16B:
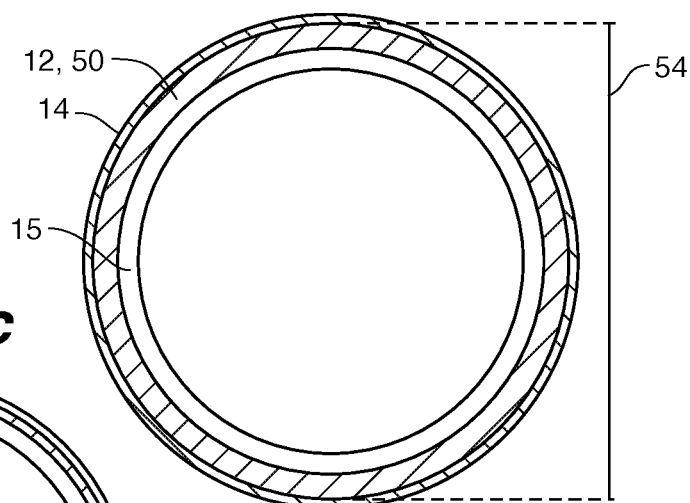
FIG. 16b is a cross-sectional view of the connected assembly shown in FIG. 16a taken along reference line A.
Figure 16C:
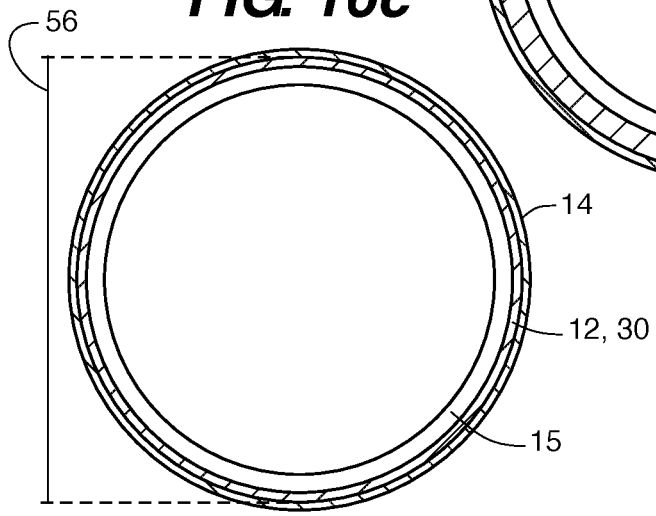
FIG. 16c is a cross-sectional view of the connected assembly shown in FIG. 16a taken along reference line b.

Turning now to the embodiment shown in FIGS. 14-16c, here the exhaust pipe 12 of the clothes dryer 10 is provided with an external engagement lip or ridge 50, which, as is shown by comparing the pip sections shown in FIGS. 16b and 16c, is a region of the pipe 12 having an outer diameter 54 greater than the outer diameter 56 of adjacent pipe regions 28 and 30. Where the channel 20 of the previous embodiments shown in FIGS. 5-12 provided a channel for the clamp 16/18 to push the engagement region 44 of the vent tubing 14 into; in the present embodiment the lip 50 acts as a stop against which the clamp 16/18 pinches the engagement region 44 of the vent tubing 14, thereby preventing inadvertent disconnection of the vent tubing 14 from the pipe 12.

The engagement lip 50 is shown in FIGS. 14-16b as having a continuous uniform diameter or thickness about the entire circumference of the pipe 12. It should be understood however, that such continuity is not necessary. The lip 50 may be a constant diameter or a non-constant diameter, or even in the form of multiple protrusions that effectively form a lip against which the clamp 16/18 may be positioned to secure the engagement region 44 of the vent tubing 14 between the lip protrusion(s) 50 and the clamp 16/18.

Figure 17:
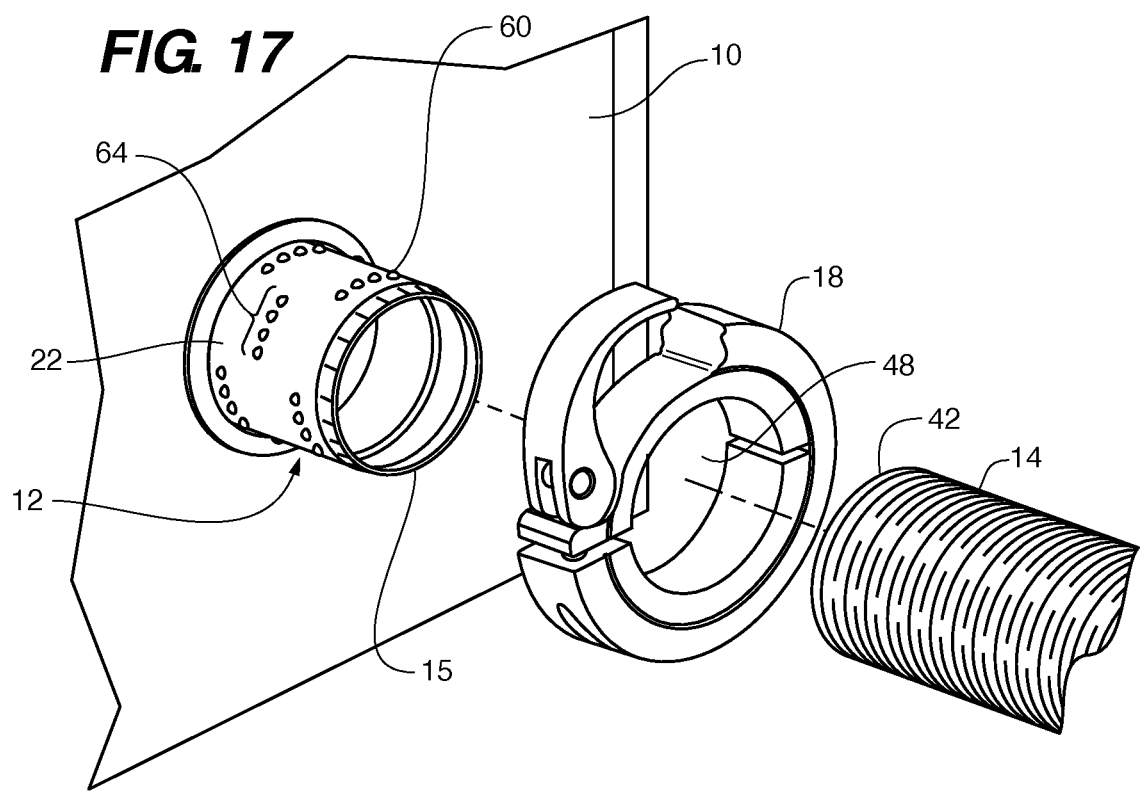
FIG. 17 is a partial rear perspective view of an improved clothes dryer having an embodiment of the improved exhaust pipe featuring outer surface protrusions for engaging the inner surface of the vent tubing, and a lever actuated collar clamp shown prior to the connection of the vent tubing to the exhaust pipe.
Figure 18:
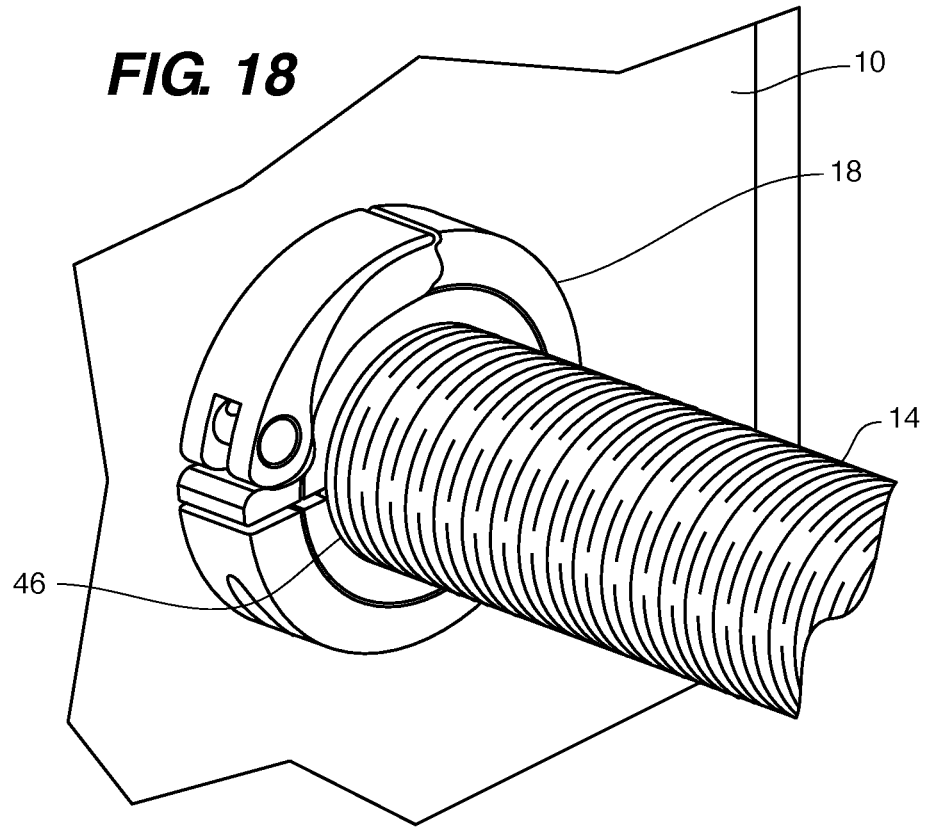
FIG. 18 is a perspective view of the improved clothes dryer of FIG. 17 showing the connected assembly of the vent tubing disposed about the exhaust pipe and secured thereto using the lever actuated collar clamp.
Figure 19:
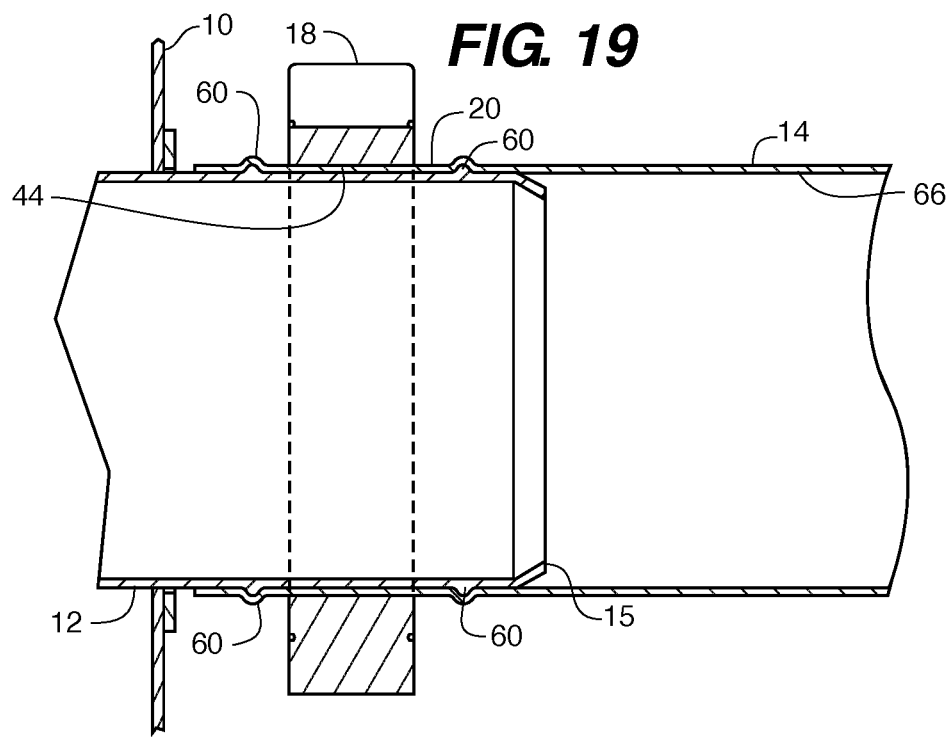
FIG. 19 is a side sectional view of the connected assembly shown in FIG. 18.

In some embodiments, rather than providing the pipe 12 with an engagement lip 50 in the manner described above, the pipe 12 may be provided with a pattern of external surface protrusions 60 such as in the manner shown in FIGS. 17-19. Here surface protrusions 60 are raised portions of outer surface 22 of the pipe 12 in the manner of the lip 50, but rather than being continuous and circumferentially positioned about the pipe 12, they are instead distributed around the outer surface of the pipe 12 according to an engagement pattern 64.

When the vent tubing 14 is disposed over the pipe 12, the protrusions 60 will engage the inner surface 66 of the vent tubing 14. A clamp 16/18 may also be placed about the assembled pipe 12 and vent tubing 14 to further secure the assembly in the same manner as previously described above. Depending on the pattern of protrusions 60, the protrusions 60 may effectively form a channel 20, into which the clamp 16/18 by be secured, such as in the manner shown in FIG. 19.

Figure 20:
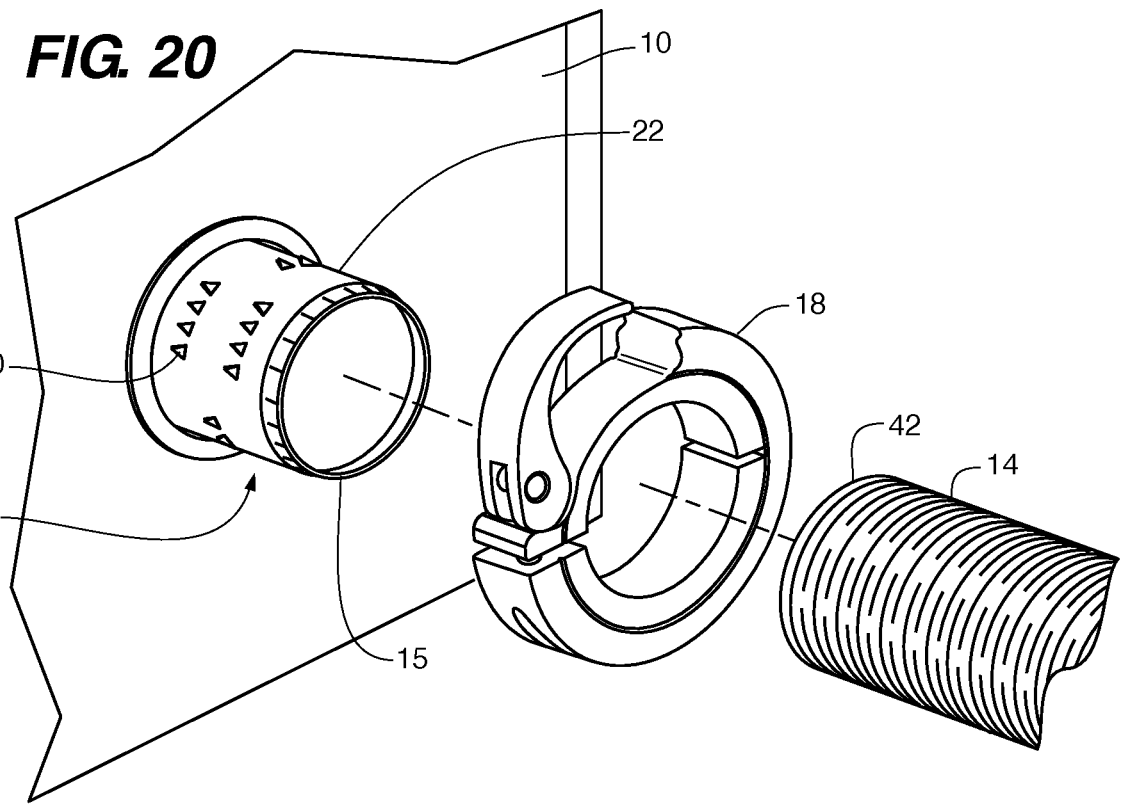
FIG. 20 is a partial rear perspective view of an improved clothes dryer having an embodiment of the improved exhaust pipe featuring outer surface tabs or teeth configured to engage the interior surface of vent tubing, and including a lever actuated collar clamp shown prior to the connection of the vent tubing to the exhaust pipe.
Figure 21:
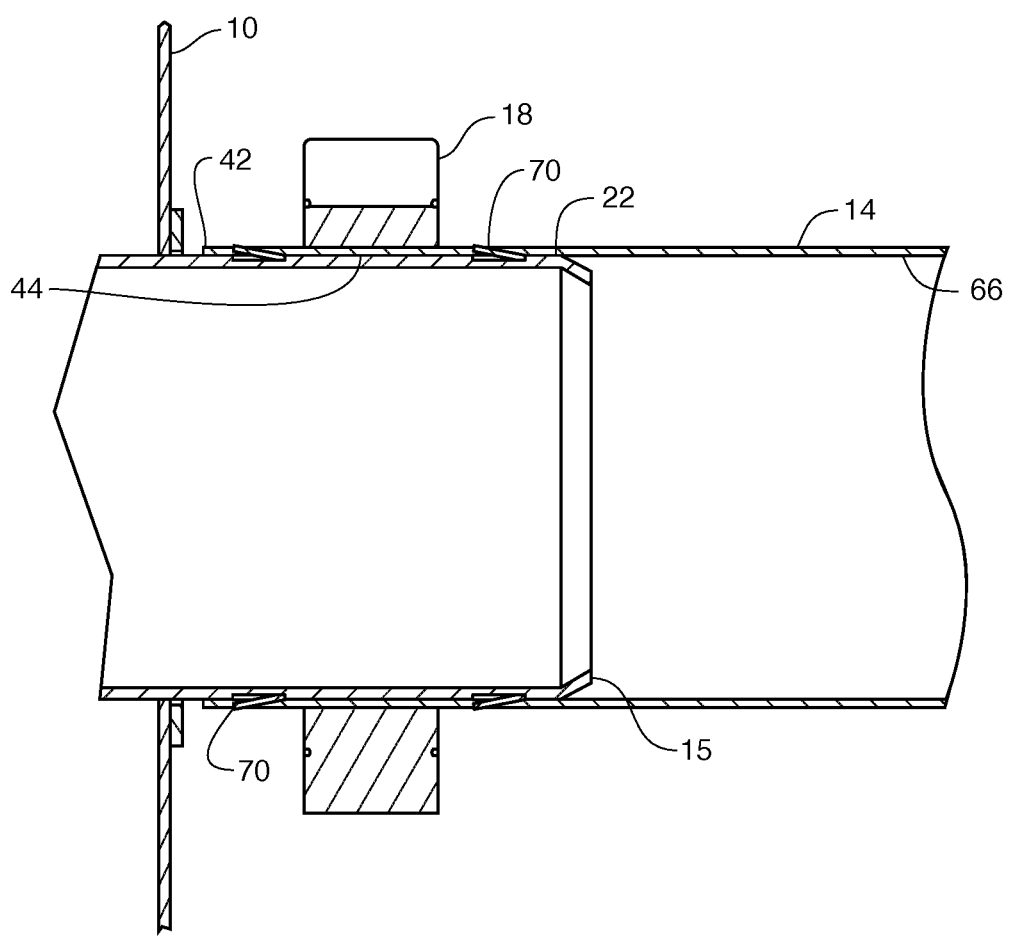
FIG. 21 is a side sectional view of the assembled components shown in FIG. 20.

In another embodiment shown in FIGS. 20 and 21 the exhaust pipe 12 of the clothes dryer 10 is provided with a plurality of raised flanges or "teeth" 80 that are formed by providing triangular tabs of material, which protrude slightly outward from the adjacent outer surface 22 of the pipe 12. These teeth 80 are uniformly oriented such that when the end 42 of the vent tubing 14 is slide over the outer surface 22 of the pipe 12, the teeth 70 with "bite" or more accurately hook into the inner surface 66 of the vent tubing 14 thereby preventing the vent tubing 14 from being readily withdrawn from the pipe 12. A clamp 16/18 may be optionally disposed about the assembled pipe 12 and vent tubing 14 to further secure their interface.

In some embodiments, the teeth 70 are cut or otherwise formed from the outer surface 22 of the pipe 12. Ideally, if the teeth 70 are cut out from the outer surface of the pipe 12, the "cuts" do not extend entirely through the wall of the pipe 12, thereby ensuring that the pipe 12 does not leak as a consequence of the formation of the teeth 70. In some embodiments, the teeth 70 are metal or plastic protrusions added to the outer surface of the pipe 12, such as by adhesion, welding, etc. or by providing the pipe 12 with a collar (not shown) pre-equipped with teeth 70, etc.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A clothes dryer having an improved exhaust pipe assembly extending therefrom, the pipe assembly comprising: a tubular clothes dryer exhaust pipe having a first section, a second section and a third section, the second section being a raised lip between the first section and the third section, the first section and the third section having a first outer diameter, the second section having a second outer diameter, the second outer diameter being greater than the first outer diameter, wherein a flange has a length ranging from about 0.125 inches (3.175 mm) to about 0.5 inches (12.7 mm) and defines and angle of about 30 decrees relative to a cylindrical interior wall of the pipe such that the flange acts as a guide engaging and sliding a piece of vent tubing onto and over the pipe which reduces the vent tubing from sliding off of the pipe once properly seated.

2. The clothes dryer of claim 1, wherein the first section, the second section and the third section have a uniform internal diameter.

3. The clothes dryer of claim 2, further comprising a length of vent tubing and a securement collar, an end of the vent tubing is disposed about the tubular exhaust pipe, a portion of the vent tubing defines an engagement region, the engagement region being a region of the vent tubing that is positioned over and immediately adjacent to the raised lip of the exhaust pipe, the securement collar disposed about the engagement region and biasing the engagement region against the raised lip.

4. The clothes dryer of claim 1, the tubular exhaust pipe further having a fourth section and a fifth section, the fourth section being a second raised lip between the third section and the fifth section, the fourth section having the second outer diameter, the fifth section having the first outer diameter.

5. The clothes dryer of claim 4, wherein the fourth section and the fifth section have the uniform internal diameter.

6. The clothes dryer of claim 5, further comprising a length of vent tubing, an end of the vent tubing is disposed about the tubular exhaust pipe, portions of the vent tubing define a first engagement region and a second engagement region, the first engagement region being a region of the vent tubing that is positioned over and immediately adjacent to the raised lip of the exhaust pipe, the second engagement region being a region of the vent tubing that is positioned over and immediately adjacent to the second raised lip of the exhaust pipe.

7. The clothes dryer of claim 6, further comprising a securement collar, the securement collar disposed about the vent tubing between the first engagement region and the second engagement region.

8. The clothes dryer of claim 2, wherein the first section defines an inwardly tapered region, the inwardly tapered region defining a diameter less than the uniform internal diameter.

* * * * *